United States Patent [19]

Das

[11] Patent Number: 5,778,514
[45] Date of Patent: Jul. 14, 1998

[54] METHOD FOR FORMING A TRANSDUCING HEAD

[75] Inventor: Shyam Chandra Das, Cupertino, Calif.

[73] Assignee: DAS Devices, Inc., Milpitas, Calif.

[21] Appl. No.: 384,247

[22] Filed: Feb. 6, 1995

Related U.S. Application Data

[63] Continuation of Ser. No. 1,383, Jan. 6, 1993, abandoned.

[51] Int. Cl.$^6$ .................................................. G11B 5/42
[52] U.S. Cl. ............................... 29/603.14; 29/603.15
[58] Field of Search ......................... 29/603.14, 603.15, 29/603.16

[56] References Cited

U.S. PATENT DOCUMENTS

| | | | |
|---|---|---|---|
| 3,685,144 | 8/1972 | Trimble | 29/603.14 |
| 3,908,194 | 9/1975 | Romankiw | 360/113 |
| 3,927,470 | 12/1975 | Case | 29/603.16 |
| 4,165,525 | 8/1979 | Koel et al. | 360/125 |
| 4,396,967 | 8/1983 | Argumedo et al. | 360/121 |
| 4,418,472 | 12/1983 | Lorenze, Jr. | 29/603 |
| 4,422,117 | 12/1983 | Nomura et al. | 360/126 |
| 4,490,760 | 12/1984 | Kaminaka et al. | 360/126 |
| 4,774,755 | 10/1988 | Yoshisato et al. | 29/603 |
| 4,807,076 | 2/1989 | Nakashima et al. | 360/126 |
| 4,874,922 | 10/1989 | Vadnais | 219/243 |
| 4,896,417 | 1/1990 | Sawada et al. | 29/603.14 |
| 4,897,915 | 2/1990 | Ito | 29/603 |
| 4,899,434 | 2/1990 | Roberts | 29/603 |
| 4,939,837 | 7/1990 | Krounbi | 29/603 |
| 4,949,207 | 8/1990 | Lazzari | 29/603.15 |
| 4,967,298 | 10/1990 | Mowry | 360/113 |
| 4,985,985 | 1/1991 | Das | 29/603 |
| 5,059,278 | 10/1991 | Cohen et al. | 156/643 |
| 5,073,242 | 12/1991 | Hamilton | 204/192.22 |
| 5,075,956 | 12/1991 | Das | 29/603.14 |
| 5,084,957 | 2/1992 | Amin et al. | 29/603 |
| 5,091,810 | 2/1992 | Kakizaki | 360/103 |
| 5,093,980 | 3/1992 | Maurice et al. | 29/603 |
| 5,155,646 | 10/1992 | Fujisawa et al. | 360/126 |
| 5,255,141 | 10/1993 | Valstyn et al. | 360/126 |
| 5,267,112 | 11/1993 | Batra et al. | 360/119 |
| 5,404,635 | 4/1995 | Das | 29/603 |

*Primary Examiner*—Carl E. Hall
*Attorney, Agent, or Firm*—Cushman Darby & Cushman IP Group of Pillsbury Madison &Sutro LLP

[57] ABSTRACT

Metal-in-the-gap (MIG) transducing head formed on a substrate for use in a magnetic storage device for writing and/or reading data in the form of magnetic flux onto and/or from tracks on magnetic media which moves relative to the head, formed by batch processing techniques. In preferred embodiment, MIG head is write head and further includes magnetoresistive read head, all on a common substrate.

19 Claims, 12 Drawing Sheets

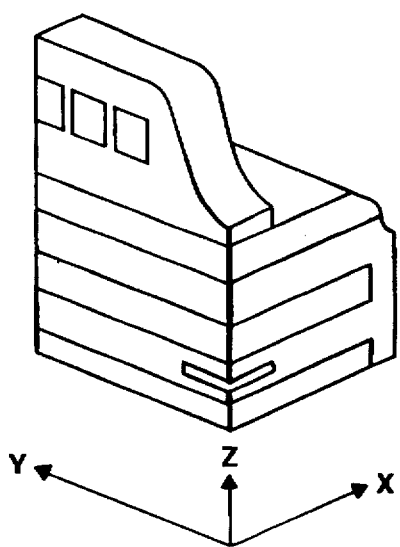
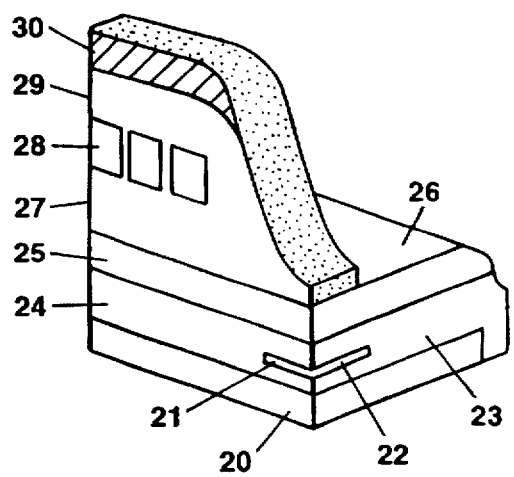
*Figure 4A*
PRIOR ART
*Figure 4B*
PRIOR ART

METHOD FOR FORMING A TRANSDUCING HEAD

RELATED APPLICATION

This application is a continuation of Ser. No. 08/001,383, filed Jan. 6, 1993, now abandoned.

BACKGROUND OF THE INVENTION

1. Field of Invention

The invention relates generally to magnetic data storage devices, and particularly to heads for use in high density data storage and retrieval.

2. Description of the Prior Art

A read/write head is used to record and store information on a rotating magnetic disk or magnetic tape, and also to read back the stored information. A typical mass storage device stores information on spinning magnetic disks, the information being recorded in the form of transitions in magnetic flux on the magnetic surface of the disk. In particular, the data is recorded in a plurality of tracks, with each track being a selected radial distance from the center of the disk. The number of transitions per inch along the track defines the bits per inch (BPI), and the number of tracks per inch along the radial distance defines the tracks per inch (TPI). The product of the BPI and the TPI defines the areal density stored in the magnetic film on the disk. A read/write head flies in close proximity to the disk surface and is held in approximate radial position over the disk by an arm. Under the control of the system's processor unit the arm can move the read/write head to the appropriate track in which the data is recorded so that it may be read, or into which data is to be written.

A commonly used inductive read/write head comprises two pole pieces formed from a magnetic material and a write coil. At one end, the pole pieces are touching and at the other end there is a slight gap between the pole pieces. The head is positioned so that the gap is directed towards the disk surface. When electric current is impressed on the coil, a magnetic flux is generated, which is impressed upon the pole pieces. The width of the poles along the track direction corresponds to the width of the track in which information is recorded by this head. The smaller the pole width, the narrower is the track, thereby increasing TPI, which is the trend of the future in high density recording.

At the gap between the poles, the magnetic flux is directed through the magnetic material in the adjacent disk surface to thereby impress magnetic flux therein. A head with a thinner gap writes narrower transitions, thereby increasing BPI. Higher BPI and higher TPI increases areal density, thereby allowing storage of more information in one square inch of the disk surface. This higher storage density is very desirable for miniaturized disk drives with high information storage capacity, as needed for many computers, e.g., PCs, workstations, laptops, notebooks, and the like.

When data is being written onto a disk, the coil is energized with a varying current pattern which corresponds to the data to be written. The varying current results in the generation of the corresponding pattern in the magnetic flux which the head applies to the surface of the rotating disk. Since the disk moves relative to the head, the magnetic flux on the disk surface also varies along the length of the arc traversed by the head on the disk.

When the data is read, the head flies over the arc of the disk surface in which the data was written. A small amount of flux from the disk permeates mostly into the poles of the head. The flux in the head varies in response to the pattern of flux recorded on the disk. The varying flux results in the generation of a varying voltage in the coil, which, in turn, is sensed as the previously-recorded data.

FIG. 1 is a perspective view to show a prior art composite head for computers which comprises a rectangular block-like slider 1 extending in running direction of the magnetic disk, two or more raised rails 2, 3 provided on the slider surface facing the disk, and a recess 4 formed at the tip end of the slider 1 in the longitudinal direction extending through the sides of the slider. A groove 8 is formed along the running direction of the disk at the tip end of the slider 1 in one of the rails 2. A head core 5 is inserted into the groove, and an interstice between the groove 8 and the core 5 is filled with fused glass. In the figure the numeral 7 denotes the magnetic gap of the head core 5 exposed on the rail surface of the slider 1. The head core 5 is embedded in the groove 8 in a manner that one core side 6 straddles over said U-shaped recess 4, and after the surrounding space thereof is filled with fused glass for fixing the same, wire 9 is wound around the core side 6 through the recess 4.

U.S. Pat. No. 5,091,810 teaches the art of attaching the head core on the side of the slider. The core 5 is usually formed of a suitable material, such as ferrite, or a ferrite frame 10 shown in FIG. 2 whose inner lining 11 is a high magnetic saturation moment material, such as "Sendust" made of iron-aluminum-silicon. High density magnetic recording requires high coercivity media, and the purpose of the high moment lining material 11 is to deliver strong magnetic flux to saturate the high coercivity magnetic disk in the writing process. Such heads are generally known as metal-in-gap (MIG) heads. MIG heads are very good writers even on high coercivity media, which a ferrite core alone is incapable of doing. The MIG head is a relatively inexpensive to produce; but it has limitations in the read operation, particularly due to its higher inductance, geometrical control and lower efficiency at higher data rate.

In the MIG head, the core 5 includes two facing sections, 12 and 13. Each section is generally formed by cutting grooves 14 and 15 in mating substrates shown in FIG. 3A, 3B. Then Sendust, layer 11 shown in FIG. 2, and bonding and gap material glass, are deposited. The substrates A and B are then mated, whose cross-section is represented in FIG. 2, and fused to form glass bond, which defines the read/write gap 7. The size of the read/write gap 7 determines the BPI which can be written by the head. Thus, the thickness of the bonding material defining the read/write gap 7 determines bit density.

After bonding the substrates A and B, slices of appropriate thickness are cut from the composite substrate and are lapped and cut again to obtain the core whose section is shown in FIG. 2. The side 16 of the core is either premachined or machined to the thickness W after bonding to slider 1. The thickness W of the core is the track width, determining the track density.

In the prior art of making MIG head, each core is individually bonded to the individual slider, then wire is wound around the core and then each individual head is lapped to the desired throat height. Throat height, which is the distance from the zero throat apex angle 17 to the air bearing surface (ABS), the head surface closest to the media, is critical to the read/write performance of the head. The present mechanical way of defining track-width and throat height of a MIG head leads to dimensional inconsistencies which is a limitation for high density recording.

A another type of read/write inductive head is the thin film head produced by thin film processing and photolithographic technology. This type of head has very good geometrical control, has lower inductance and better performance at higher data rates than the MIG. However, it is expensive due to complex processing technology.

In the known process for making thin film heads, first of all, an insulating base layer of, for example, alumina, is deposited on a substrate. Because this base layer is insulating, a sputtered seed layer of a material such as NiFe is then applied to the base layer. Photoresist is then spun over the seed layer and a pole piece pattern is then formed by photolithographic technique. Then NiFe is electroplated by the conventional technique to form the first layer of the poles.

More specifically, a typical thin film head is fabricated by first through-mask plating of the first magnetic pole (P1) on the previously sputtered seed layer. After plating of the P1 pole, the seed layer is removed by sputter etching from the "moat" area surrounding the P1 pole geometry, while the P1 pole geometry itself is protected with photoresist applied by a photolithographic process and then current thieve areas are chemically etched away and the photoresist protection is removed by dissolving the photoresist in a solvent. This defines the NiFe magnetic pole piece P1. Then a 0.3 to 0.6 micron thick alumina layer on P1 defines the read/write gap. Alumina in the back closure area (away from the poletip area) is then etched away to enable contact between P1 and the still to be formed P2 pole at the back of the yoke, distal from the head's air bearing surface defined at the polished ends of the P1 and P2 poletips, again via photolithography and chemical etching processes.

Copper coils, separated by a hard-baked photoresist polymer layer, are then deposited along with bonding pads. The coils and the next to be formed magnetic pole P2 layer are separated by the hard-baked photoresist layer. The P2 magnetic pole is then deposited on the then built structure using a through-mask plating process in the same manner as the pole P1 was defined. Then thick conducting studs on the bonding pads are plated, and the whole structure is buried under a 30–50 micron thick alumina encapsulation layer. The bonding pads are then exposed by mechanical lapping of the encapsulant alumina. Gold plating is done in the pad areas for wire bonding to connect with the external circuit. The wafer is then cut into bars and sliders, lapped to predefined position, and are mounted on flexure for their use in the computer data storage disk drives.

Readback voltage induced in the coil of this type of head, called an inductive head, varies with the rate of change of flux as the disk rotates adjacent the head. It is therefore evident that reading of data with conventional heads is sensitive to the speed of the disk relative to the head, that is, the speed of rotation of disk or the diameter of the disk. Current industry demand in workstations, PCs, laptop, and note-book products require small (3.5, 2.5, 1.8 and 1 inch) high volumetric density disk drives. Low power consumption is one of the most important requirements of these drives, and thereby limits the use of increased rotational speed of the disk-stack to get higher readback voltage from an inductive head.

The newest type of read/write head uses thin film inductive head for write operation and magnetoresistance of the sensor for read operation, commonly known as an MR head. The readback signal from an MR head is velocity independent, has higher signal to noise ratio, higher TPI capability, still lower inductance, and other advantages, over the inductive read head. A review of MR heads is given by Das in Proceedings of The Second International Symposium on Magnetic Materials, Processes, and Devices, Electrochemical Society, Proceeding volume 92-10 (1992), page 135, titled "The MR Head: An Emerging Trend in Hard Drive Head Development", incorporated herein by reference.

A commonly used MR head, as described in my above paper, has an inductive write head sitting on the top of the MR read section in a piggy-back fashion, shown in FIG. 4A and FIG. 4B. In reference to FIG. 4B, this type of piggy-back MR head may be fabricated by first depositing about 1.5 micron of a soft magnetic material, e.g., Sendust, to act as the bottom shield 20. (Sendust is preferred instead of NiFe to prevent smearing and shorting of the MR element with the shields.) A 0.2–0.4 micron thin insulating gap (alumina or SiO2) material 21 is deposited on this soft magnetic material. Then NiFeRh soft adjacent magnetic material along with a Ta spacer layer (25–100 Angstrom thick) for transverse biasing, NiFe (150–400 Angstrom thick) MR element, patterned ferromagnetic (CoPt) or anti-ferromagnetic (FeMn) exchange coupled film for longitudinal biasing, all of which is shown together at numeral 22, are deposited and formed.

The read track width is defined by the width of alumina or SiO2 deposited and patterned in the central region of the MR element stripe. Then tungsten leads 23 for the MR sense current is formed. The choice of tungsten as the lead material minimizes corrosion and shorting due to smearing. After the lead 23, another 0.2–0.4 micron gap material 24 and the top magnetic shield 25 are deposited. The shield material is typically 3–4 micron thick NiFe, and this also works as the bottom write pole of the inductive write head completed on the top of it. This completes the MR read structure. The write head is completed on top thereof by sequential deposition of the write gap 26, hard-baked photoresist first insulation layer 27, the copper coil 28, second layer insulation 29 and the top NiFe pole 30. Thus the existing MR head is more expensive and complex than thin film inductive head because it uses inductive thin film technology as well as thin film MR sensor technology.

The invention disclosed herein combines a less complex and inexpensive technology of making an efficient MIG write head with a very efficient MR read structure. Also described is an efficient manufacturing method of making a MIG type read/write head.

SUMMARY OF THE INVENTION

This invention teaches a new and efficient method of making a read/write MIG type head. The core fabrication and bonding with the slider is done in a batch manner. Grooves of defined geometry are cut at a specified interval in ferrite or ceramic substrates, and high saturation material such as Sendust and bonding material such as glass or nonmagnetic metal are deposited upon which patterns for accurate control of track width and alignment marks for defining zero throat are formed, then grooves of the two substrates are matched and fused to bond. Then slices are cut from this workpiece containing columns of the core structure, which is lapped to a thickness determined by track-width defining marks. The bonding material, such as glass or metal, are deposited on the lapped surface. On a separate non-magnetic substrate, from which the slider body is to be made, grooves at specified interval and depth, with reference to predefined lapping guide for determining throat height, are cut in the X-and Y-directions. The slice-containing core is mated with the Y-cut in a manner that the opening in the core is matched with the X-cut in the substrate and in reference to the lapping guide, then bonded together. Then wire is wound on each core through the X-cut. Now the rows of slider are cut and lapped to the desired throat height with the help of the lapping guides and then parted into individual sliders.

In an alternative approach, the core is not complete, but it has only half of the core. Grooves of defined geometry are cut at a specified interval in ferrite or ceramic substrates, and high saturation material such as Sendust is deposited. Then slices are cut from this workpiece containing columns of the U-shaped core structure and which are lapped on the cut surfaces. The bonding material, such as glass or metal, is deposited on the lapped surface. On a separate non-magnetic substrate, from which the slider body is to be made, grooves at specified interval and depth, with reference to predefined alignment marks, are cut in the Y- direction. The slice containing core is mated with the Y-cut and is kept butted with this surface by pressing with a wedge shaped glass shim, and any openings are filled with glass, and fused and lapped to planarization. The U-shaped bonded core acts as the bottom pole of the head. Coil turns may now be plated, different layers may be insulated with alumina or SiO2. The insulation from contact points, front-tip and back-closure of the pole are etched and gap material is deposited, and etched again from the back closure and the contact points. Then the top pole is deposited.

Another embodiment of this invention is to combine a MIG type inductive head for write and the MR head for the read. Any of the above two inventions may be used to make an inductive write head in combination with the MR read head.

BRIEF DESCRIPTION OF THE DRAWINGS

This invention is pointed out with particularity in the added claims. The above and further advantages of this invention may be better understood by referring to the following description in which common numerals are used to represent common parts, taken in conjunction with the accompanying drawing in which:

FIGS. 4A and 4B are perspective views of commonly used prior art MR head; in FIG. 4A the inductive write head is separate from the MR read head, while in FIG. 4B the top MR shield is common to the bottom write pole of the inductive head.

DETAILED DESCRIPTION OF THE ILLUSTRATIVE EMBODIMENT

Figure 5:
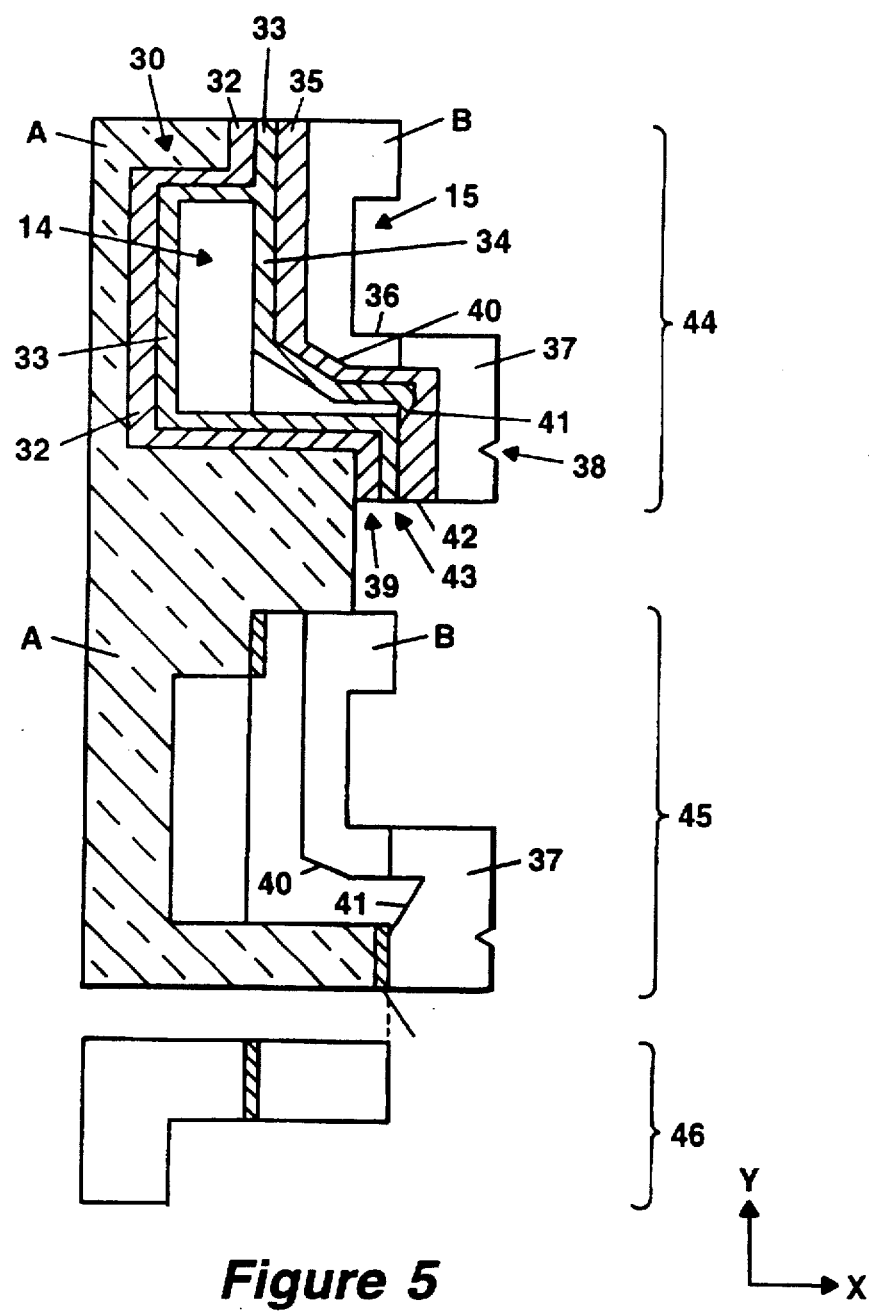
FIG. 5 is a diagram of a column of a core assembly with a reference mark defining the zero throat. This is a representative of a column of core sliced from the composite blocks after bonding the two halves. This core is intended for longitudinal recording. Slice 47 is shown in inset FIG. 5A. Slice 47 is then lapped relative to reference marks formed on the substrate, such as indicated at numeral 19, FIG. 5B.
Figure 6:
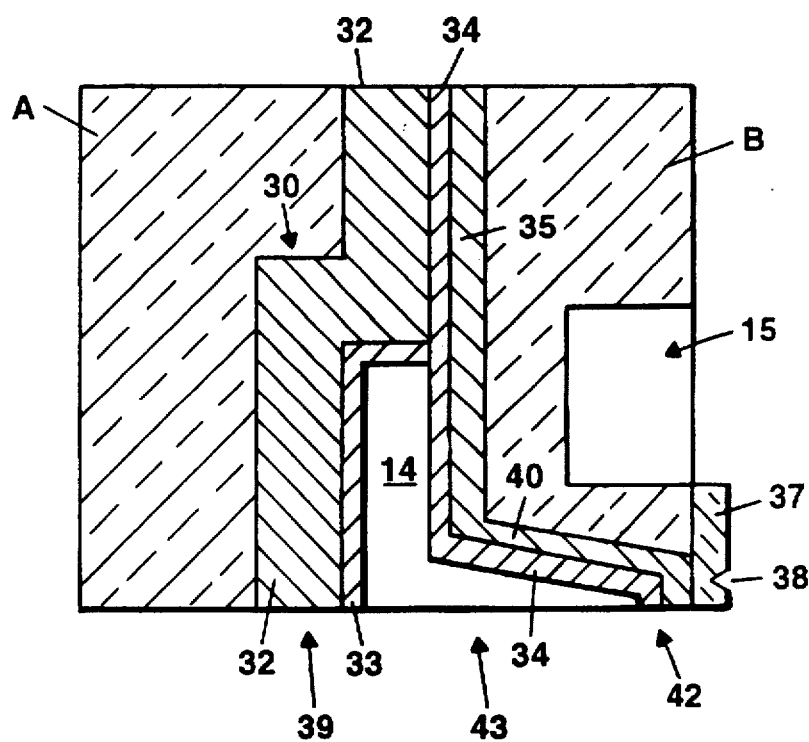
FIG. 6 is a cross-section of a core according to the present invention intended for perpendicular recording.

FIG. 5 is a diagram of a column of a core assembly in practice of an embodiment of the invention for longitudinal recording. FIG. 6 is a cross-section of a core according to the present invention intended for perpendicular recording.

Figure 1:
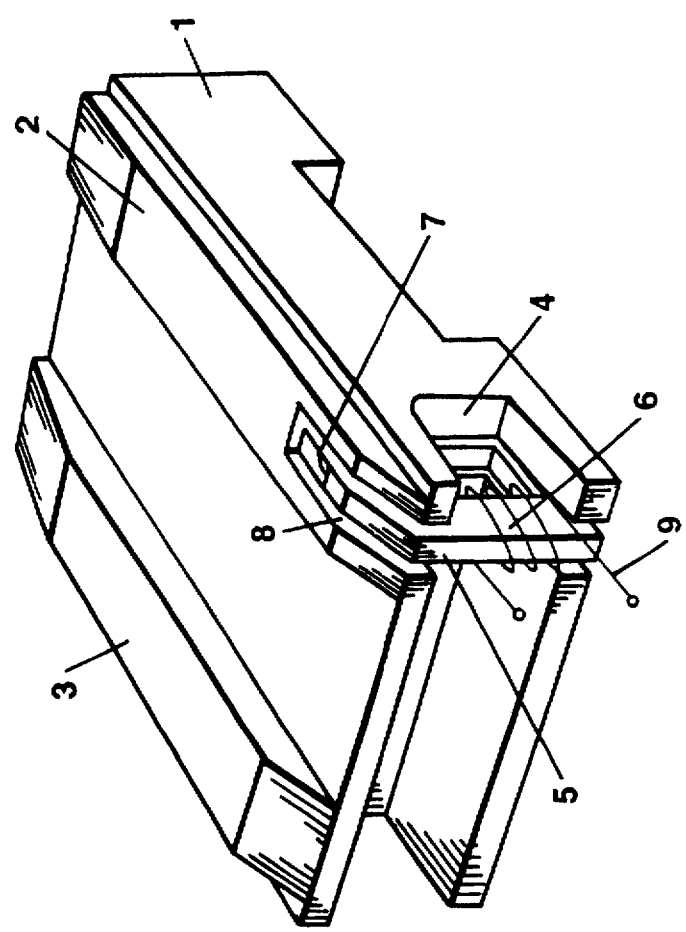
FIG. 1 is a perspective view of a conventional type prior art composite head.
Figure 2:
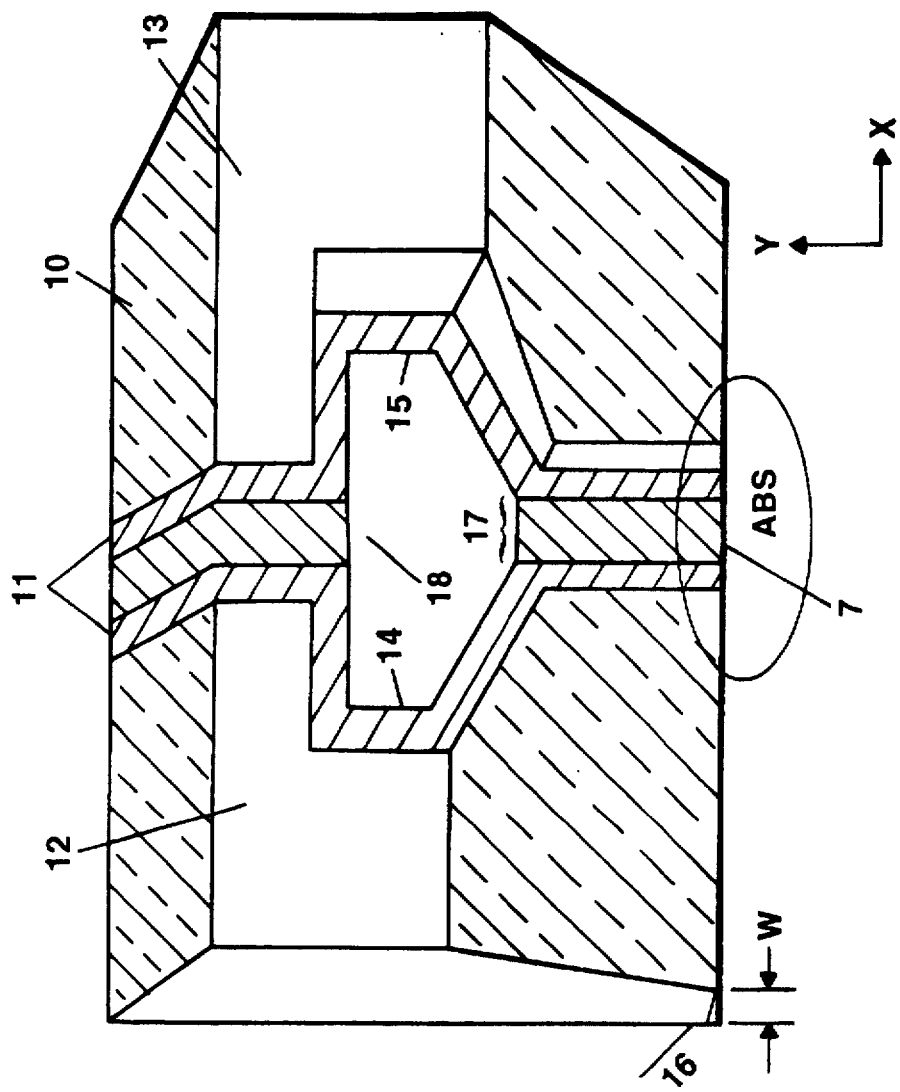
FIG. 2 is a perspective view to show the cross-section of a core of the FIG. 1 head.
Figure 3:
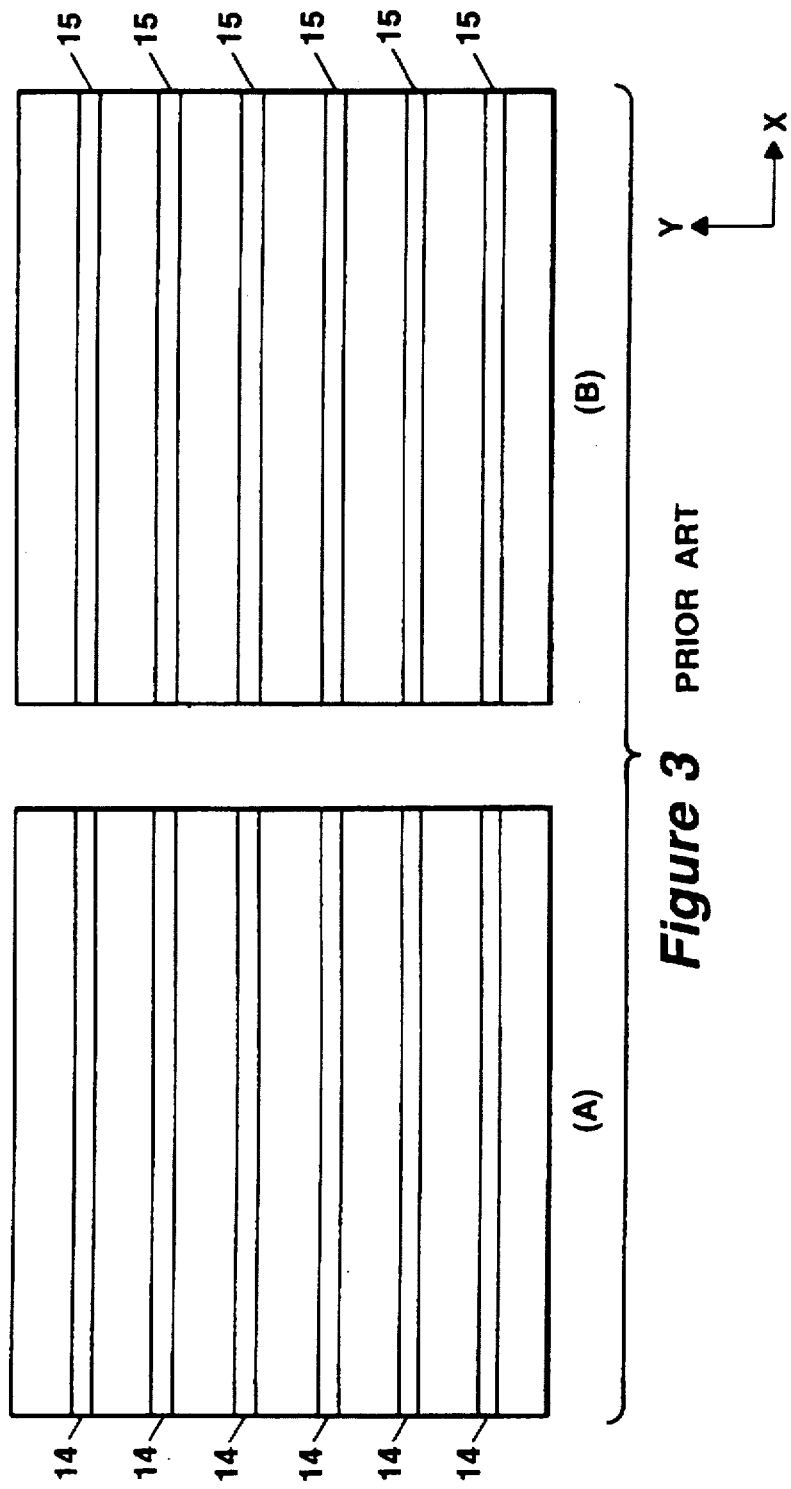
FIG. 3A and 3B are perspective diagrams of C-bar blocks showing butt grooves in the prior art.

In these embodiments, grooves 14 of FIG. 3A are cut in ferrite or ceramic block A. The back side 30 of the core is shorter than the front side 31 containing the pole-tip 39. This is to enable recess of the winding 60, shown in FIG. 9, around the core 50, to keep it below the surface of the wafer 70. The mating block B has the winding grooves 15 cut on one side and angle cut 40, 41 on the other side for reduction of flux leakage. If the machining operation makes the gap surface 42 rough then separate block 37 with polished surface 42 may be bonded at surface 36 on block B. In this process, the zero throat marker 38 may be defined so that sliders may be lapped to a known throat with reference to the marker 38.

Figure 5A:
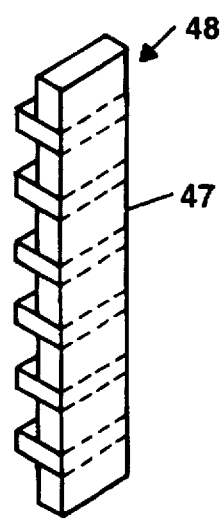
Figure 5B:
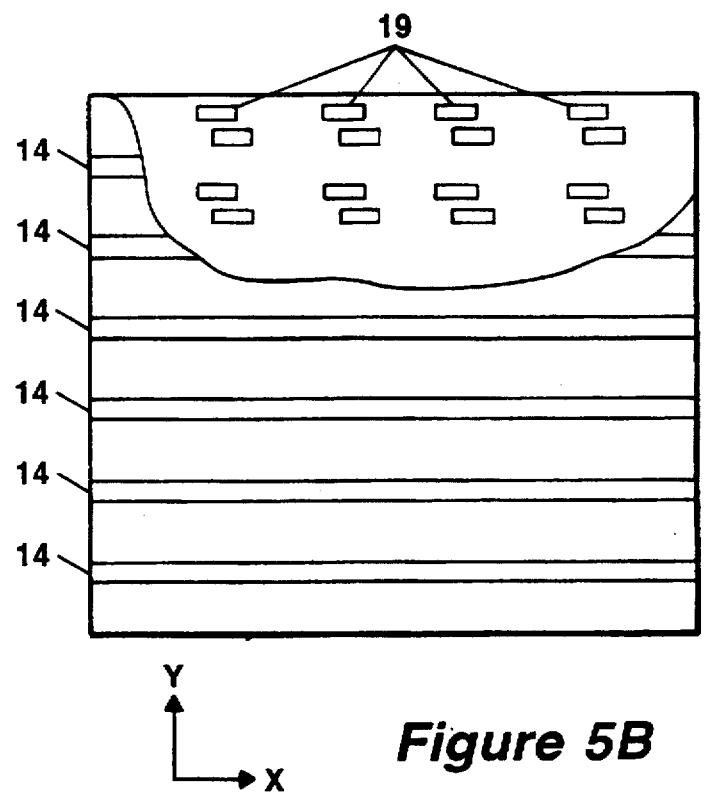

After machining operations on blocks A and B, high magnetic moment material (such as Sendust, CoZr alloy or iron nitride, etc.) 32, 35 is deposited. Material 32 is deposited on the surface containing cuts 14 on block A, and material 35 is deposited on the surface containing the angle cuts 40 and 41 of block B. The materials in the layers 32 and 35 may be laminated to improve magnetic performance. If very accurate definition of track-width and throat is desired, such patterns may be formed on at least block B on the layer 35 by photo patterning and ion milling. Then the bonding material 33 and 34, for example glass, of sufficient thickness to make the gap 43, is deposited, and the block A and block B are mated together and fused. Then slice 47, shown in inset FIG. 5A, of appropriate width, is cut from the composite of A and B, forming a column of cores 44, 45, 46, etc. (For simplicity, only core 44 is shown in detail in FIG. 5.) Slice 47, the core column, is then lapped relative to reference marks formed on the substrate, such as indicated at numeral 19, FIG. 5B, for defining the track width. Thus the final track-width is defined by lapping.

FIG. 6 follows the same description and steps as discussed above, except that the layer 32 producing the flux return tip 39 is thick to spread out the flux so as not to affect the media during the writing operation, and the poletip 42 is thin to produce a monopole like sharp field gradient for perpendicular recording.

Figure 7:
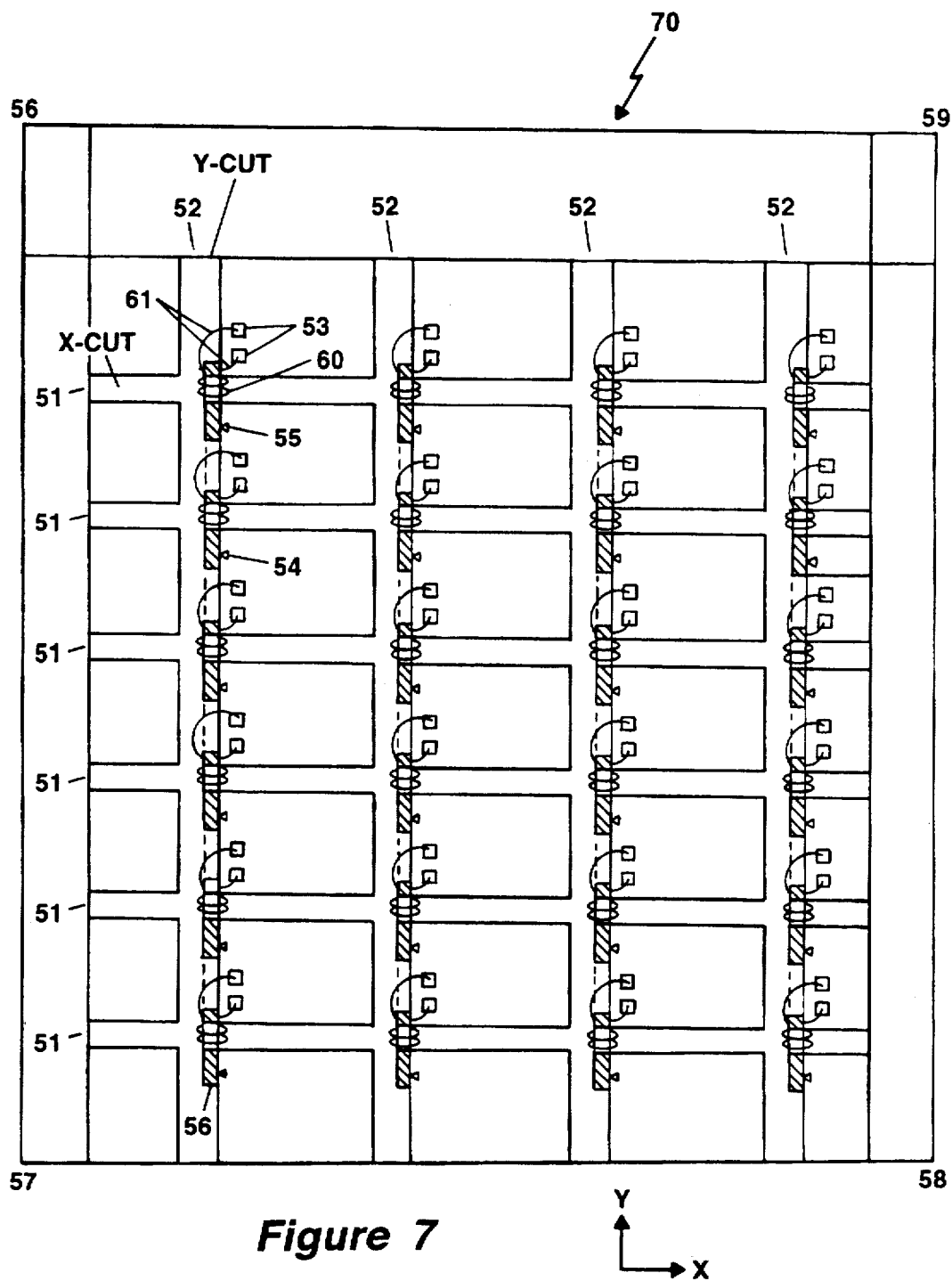
FIG. 7 is a representative several columns of cores, each column bonded in an assigned Y-cut of a substrate, shown after the wire is wound.

In reference to FIG. 7, on a separate non-magnetic substrate 70, defined by the border 56–57–58–59, from which the slider body is to be made, the X-cut grooves 51 and the Y-cut grooves 52 are made. These grooves are at specified intervals defined by the slider dimension, in reference to throat height lapping marks 55. The cuts 51 and 52 are not cut all the way through. Also, cuts are not be made all the way up to the edge of wafer 70. This will maintain sturdiness of the wafer in subsequent processing.

Now the bonding material, such as glass or metal, is deposited on the lapped surface of the core column 47.

Alternatively, bonding epoxy may be used. The glassy surface of the core column 47 is mated with the Y-cut 52 in a manner that the wire winding opening 14, 15 in the core 50 is aligned with the X-cut 51 in the substrate 70 and in reference to the lapping mark 55, then bonded together.

Figure 8:
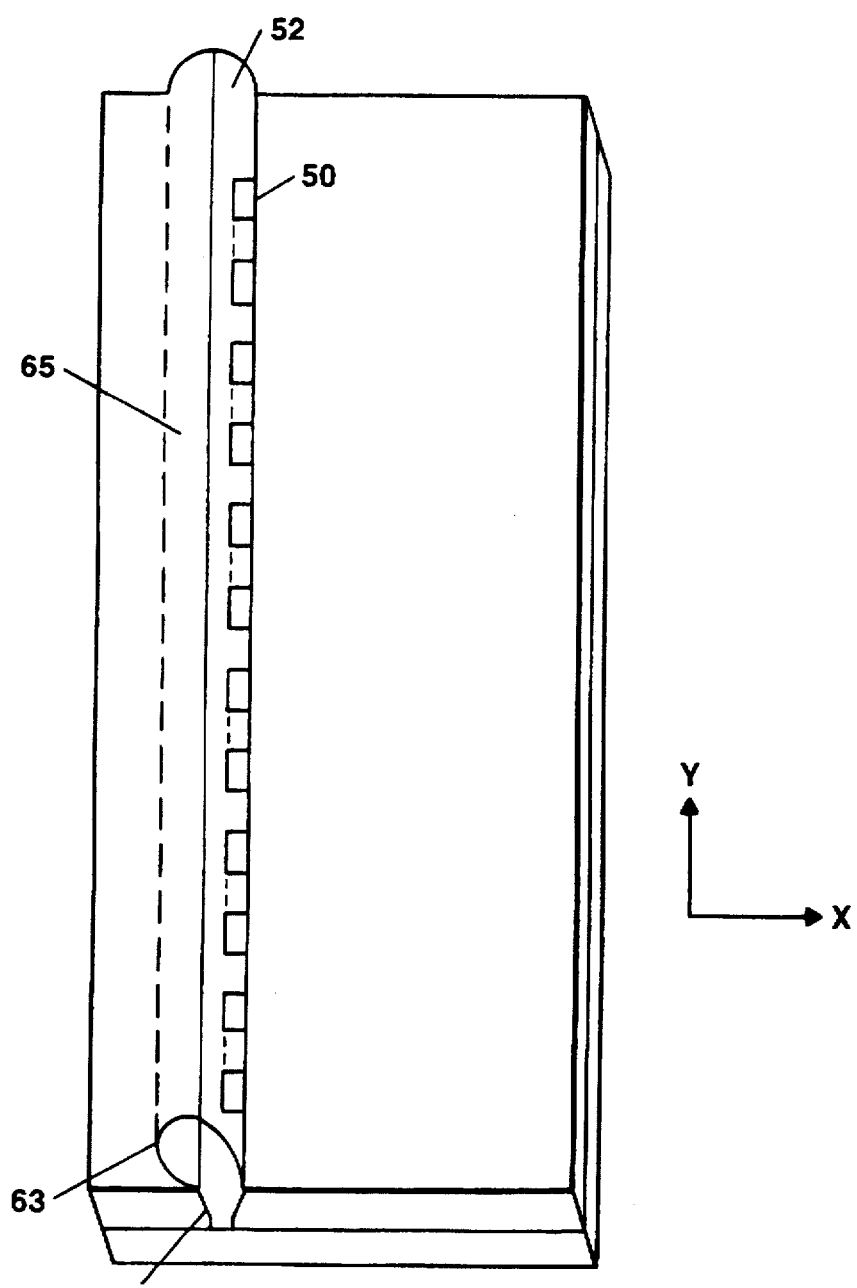
FIG. 8 is a schematic of wedge-shaped material to keep the stripe containing column of cores pressed against the substrate wall and fused to bond.

The core column 47 may be bonded to the substrate with epoxy. In case of glass bonding, the core column 47 may be attached with its side mating the Y-cut 52 on the wafer 70 with the help of a wedge shaped glass shim 65 as is shown in FIG. 8. In the case where the wire turns 60 are wound around the core 50, the glass shim 65 is put in the spaces 54 without blocking the wire winding X-cut 51 of the substrate. Then wire turns 60 are wound around each core through the X-cut 51. Now the rows of slider are cut from the assembly formed on substrate 70. The cut surface is lapped to the desired throat height with the help of the lapping mark 55, and then the parts are separated to form individual sliders.

Figure 9:
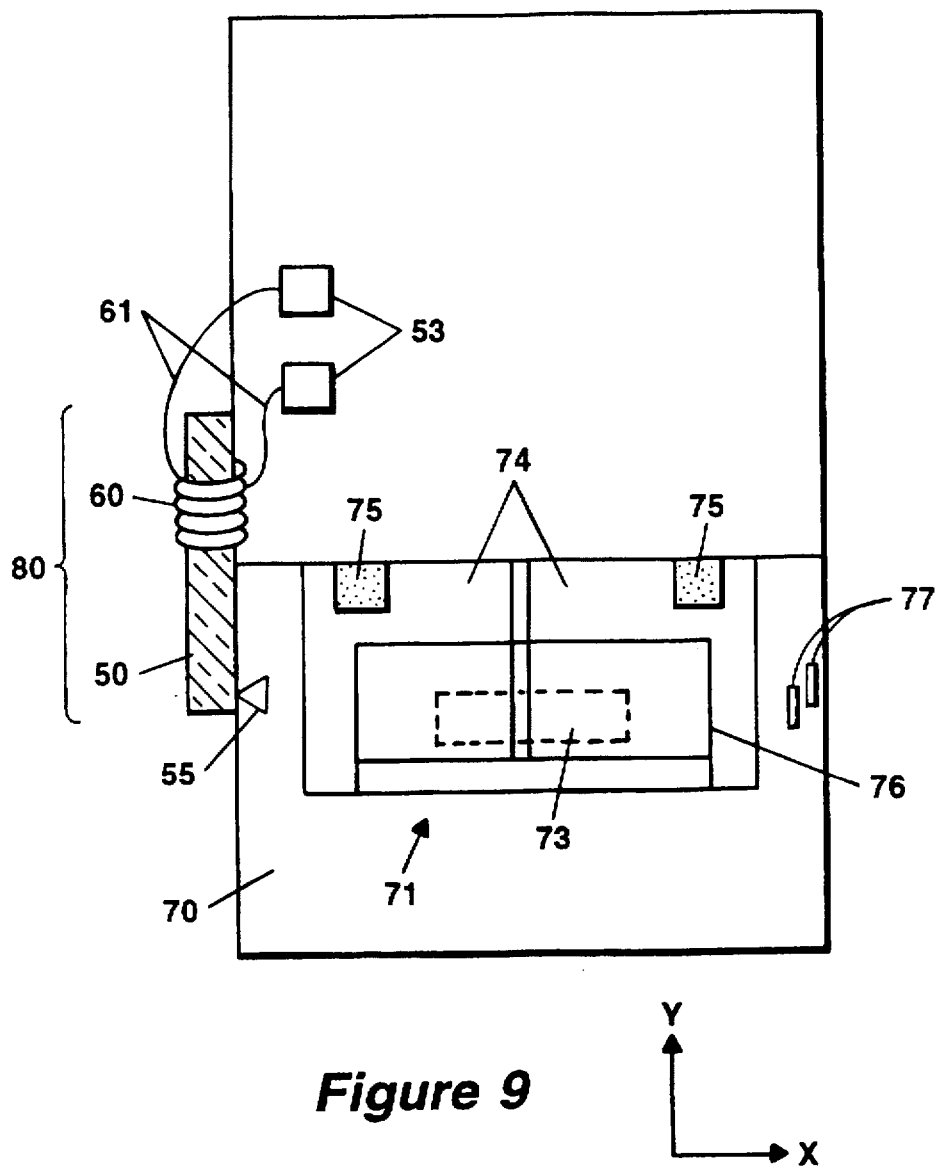
FIG. 9 is a schematic of a write head formed by bonding a core (around which wire is wound) to the substrate on which the MR read transducer is fabricated at a later stage.

FIG. 9 shows a schematic of MR read head 71 on a section of the wafer 70 before cutting into sliders, with the write head 80 formed by attaching core 50 and winding wire 60 around it. In the approach where further fabrication processing, e.g., making of MR read head 71 on the wafer 70 is to be performed, the leads 61 may be bonded with the bonding pads 53, then coated with material such as alumina, and lapped and planarized to expose the bonding pads 53.

In one approach of making an MR head the core 50 may be put in its place as has been discussed above, and the sheet of Sendust may be deposited and annealed while fusing glass to bond the core column 47 with the Y-cut 52 of the wafer 70. This annealing is necessary for magnetic performance of the Sendust shield 72 of the MR read head 71. After annealing and bonding, the Sendust sheet is patterned to form a bottom shield 72 with alignment marks 77, and may be etched by ion-beam process. A 0.2–0.4 micron thin insulating gap material (not shown in FIG. 9, but such as that designated in FIG. 4B as gap material 21) is deposited on it. Then NiFeRh soft adjacent magnetic material along with a Ta spacer layer (25–100 Angstrom thick) for transverse biasing, NiFe (150–400 Angstrom thick) MR element, patterned ferromagnetic (CoPt) or antiferromagnetic (FeMn) exchange coupled film for longitudinal biasing, all of which are shown together at 22 in FIG. 4B, are deposited and formed.

The read track-width is defined by the width of alumina or SiO2 deposited and patterned in the central region of the MR element stripe.

Then tungsten leads 74 (23 in FIG. 4B) for the MR sense current is formed. After leads 74, another 0.2–0.4 micron gap material 24 and the top magnetic shield 76 (25 in FIG. 4B), typically NiFe are deposited. Pads 75 and 53 are plated and exposed in a conventional manner.

In an alternative approach, the core is not complete, but it has only half of the core, for example, only "A" block shown in FIG. 3A is used. All the processes on the block A discussed above are performed. Slices are cut from this processed block containing columns of the U-shaped core structure and lapped on the cut surfaces. Bonding material, such as glass or metal, are deposited on the lapped surface.

Figure 10:
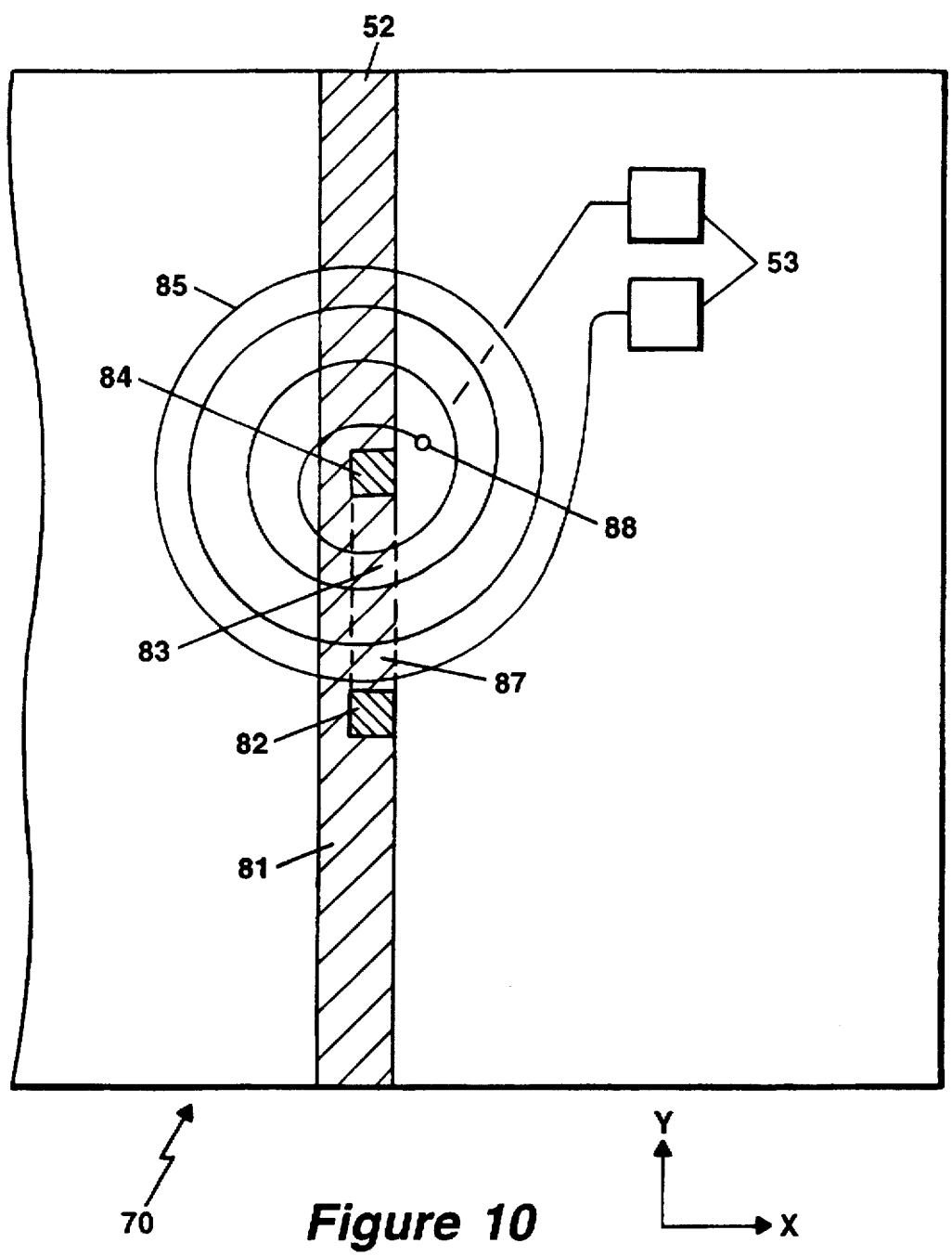
FIG. 10 is a schematic representation of an inductive head in which only half of the core is bonded to the substrate; the coil, the 2nd write pole are fabricated on it.

In reference to FIG. 10, on another of the non-magnetic substrates 70, grooves 52 are cut in the Y-direction only. The slice containing core 87 is mated with the cut 52 and is kept butted with this surface by pressing with a wedge shaped glass shim 65 shown in FIG. 8, and any openings are filled with glass, and fused and lapped to planarize, as is shown by hatched surface 81. The U-shaped bonded core 87 is the bottom pole of the head. The surface 83 may be recessed with respect to exposed front 82 and back-closure portions 84 of the core. Coil turns 85 may now be plated, different layers may be insulated with materials, such as alumina or SiO2. The insulation from contact points 88, 53, front-tip 82 and back-closure 84 of the pole are etched and gap material of desired thickness is deposited, and this is again etched from the back closure 84 and the contact points 88, 53, and tip 82. Then a NiFe top pole (not shown in FIG. 10) is deposited in a conventional manner, or another I-bar Sendust core may be bonded. If necessary, the narrow track width may be defined by track trimming, using photolithography and ion-milling.

Figure 11:
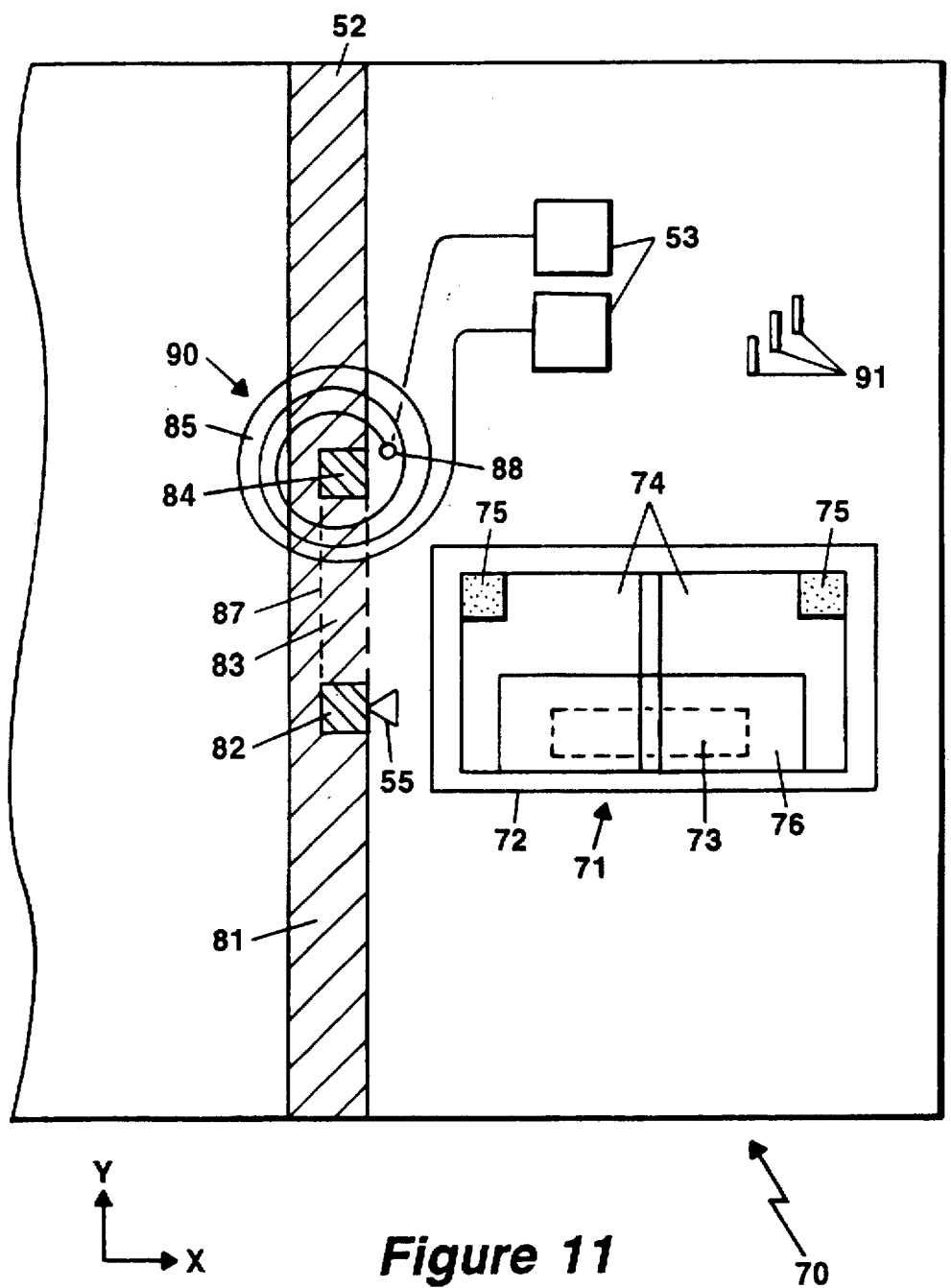
FIG. 11 is a schematic representation of an inductive write head in which only half of the core is bonded to the substrate; the write coil, the 2nd write pole and the MR read transducer are fabricated on it.

Another embodiment of this invention schematically shown in FIG. 11 is to combine an inductive write head 90 formed by bonding half of the core 87 with the cut 52 of the wafer 70 and then forming the write coil 85 by plating. The read transducer 71 is formed next to the write transducer 90.

In one process of making an MR head, the core 87 (a column of half core) may be put in its place as has been discussed above, and the sheet of Sendust may be deposited and annealed while fusing glass to bond the core 87 with the wafer. After annealing and bonding, the Sendust sheet is patterned for the bottom shield 72 and the alignment marks 91, and may be etched by ion-beam process. A 0.2–0.4 micron thin insulating gap (not shown in FIG. 11, but reference is again made to material 21 of FIG. 4B) is deposited on it. Then NiFeRh soft adjacent magnetic material along with a Ta spacer layer (25–100 Angstrom thick) for transverse biasing, NiFe (150–400 Angstrom thick) MR element, patterned ferromagnetic (CoPt) or antiferromagnetic (FeMn) exchange coupled film for longitudinal biasing, all shown together by numeral 22 in FIG. 4B, are deposited and formed.

The read track-width is defined by the width of alumina or SiO2 deposited and patterned in the central region of the MR element stripe 73, as disclosed above. Then tungsten leads 74 (23 in FIG. 4B) for the MR sense current is formed. After leads 74, another 0.2–0.4 micron gap material 24 is deposited. Contact points 53, 75 and back contact 84 are etched and exposed. The coil 85, pads 75 and 53 are plated. The top magnetic shield 76 (25 in FIG. 4B), and the top write pole (not shown), typically NiFe are deposited. Pads 75 and 53 are plated, encapsulated and exposed in a conventional manner.

For narrow trackwidth and accurate relative positioning of the read and write transducers, reference marks 91 are formed on the substrate.

The foregoing description has been limited to specific embodiments of this invention. It will be apparent, however, that variations and modifications may be made to the invention, with the attainment of some or all of the advantages of the invention. Therefore, it is the object of the appended claims to cover all such variations as come within the spirit and scope of the invention.

What is claimed is:

1. A method for forming a transducing head on a substrate comprising the steps of:
   forming a planar substrate containing a plurality of embedded cores or partial embedded cores, each of the cores being substantially U-shaped;
   forming a core/coil assembly on the substrate by defining a plurality of metallic coils thereon, wherein each of the metallic coils are in magnetic association with respective ones of the embedded cores or partial embedded cores in the substrate; and
   cutting the substrate having said core/coil assembly to define at least one slider to form the head and wherein said core forms a yoke with exposed yoke tips and provides a bottom pole of a multi-pole MIG head, and an area below said exposed yoke tips is recessed and at least one coil layer is deposited thereover, separated from said core by insulation, and then a second core is formed thereover for forming a top pole of said MIG head.

2. The method of claim 1 wherein:

a top pole of the embedded cores or partial embedded cores is formed by depositing a magnetic material thereon; and the top pole of the embedded cores or partial cores is U-shaped and at least one coil is wound around each top core.

3. The method of claim 2 further comprising the step of forming an MR read transducer associated with said substrate and adjacent to a write transducer.

4. The method of claim 3 wherein the step of forming a core/coil assembly on the substrate by defining a plurality of metallic coils thereon includes the step of forming the plurality of coils by patterning the coils using a photolithography process.

5. The method of claim 4 in which at least one throat height marker is associated with the substrate having a core/coil assembly, and the step of cutting at least one slider from the substrate having a core/coil assembly includes the step of finishing the slider to the throat height marker.

6. The method of claim 5 in which the plurality of metallic coils are plated.

7. The method of claim 6 in which the magnetic material is deposited by a first one of:

a vacuum or a plating process; and plating nickel/iron alloy.

8. The method of claim 7 in which the magnetic material is Sendust or iron-nitride.

9. The method of claim 8 in which the plurality of metallic coils are patterned on essentially a planar topography.

10. A method comprising the steps of:

(a) cutting grooves having a predetermined shape at predetermined locations in first and second substrates, each of the first and second substrates having a predetermined geometry;

(b) depositing into each of the grooves, a first material having a relatively high magnetic saturation characteristic;

(c) depositing into each of the grooves a bonding material;

(d) forming over a surface provided by the first material and the bonding material at least one target track width mark and at least one alignment mark for defining a zero throat;

(e) matching the grooves of the first and second substrates;

(f) bonding the substrates to provide a workpiece;

(g) cutting slices from the workpiece, with each of the slices containing a column of a core;

(h) lapping a surface of each of the slices to provide each of the slices having a thickness determined by the at least one track-width defining marks;

(i) depositing the bonding material on the lapped surface of the slices;

(j) cutting grooves in first and second orthogonal directions in a non-magnetic substrate, each of the grooves cut at a predetermined location in the non-magnetic substrate and having a predetermined depth;

(k) mating the slice-containing core in a first one of the grooves in the non-magnetic substrate;

(l) bonding together the slice-containing core and the non-magnetic substrate;

(m) winding a wire on each core through a second one of the grooves in the non-magnetic substrate;

(n) cutting rows of the non-magnetic substrate;

(o) lapping the rows cut in step (m) to a desired throat height; and (p) parting the lapped rows into individual portions corresponding to slider substrates.

11. The method of claim 10 wherein:

each of the first and second substrates are provided from a first one of a ferrite material and a ceramic material;

each of the first and second substrates are provided having a rectangular cross-sectional shape;

the material having a relatively high saturation characteristic is provided as Sendust; and the bonding material is provided as a first one of a glass material and a metal meterial.

12. The method of claim 11 wherein the step of bonding the substrates includes the step of fusing the glass in each of the first and second substrates to bond the first and second substrates to provide the workpiece.

13. The method of claim 12 wherein the first direction corresponds to an X-direction in a Cartesian coordinate system and the second direction corresponds to a Y-direction in the Cartesian coordinate system.

14. The method of claim 13 wherein the grooves are cut at periodic intervals in the non-magnetic substrate.

15. The method of claim 14 wherein the groove height is cut with reference to a predefined lapping guide for determining throat height and wherein the non-magnetic substrate provides a slider body.

16. The method of claim 15 wherein the step of mating the slice-containing core includes the step of mating the slice-containing core with the Y-cut such that opening in the core is aligned with the X-cut in the substrate.

17. The method of claim 16 wherein the step of winding a wire on each core through the second one of the grooves in the non-magnetic substrate includes the step of winding a wire on each core through the X-cut in the non-magnetic substrate.

18. A method of forming a head comprising the steps of:

(a) cutting grooves of defined geometry at specified intervals in a substrate;

(b) depositing a material having a relatively high magnetic saturization into the grooves of the substrate;

(c) cutting at least one slice from a workpiece, each of the at least one slices containing at least one column of a core structure having a U-shaped cross-section;

(d) lapping a cut surface of each of the at least one slices;

(e) depositing a bonding material on the lapped surface of each of the at least one slices;

(f) cutting at least one groove in a non-magnetic substrate from which a slider body is to be made, each of the at least one grooves cut at a specified location in the non-magnetic substrate with reference to predefined alignment marks and each of the at least one grooves having a predetermined depth;

(g) disposing one of the at least one slices in one of the at least one grooves in the non-magnetic substrate;

(h) pressing a wedge shaped glass shim against the one slice to keep the slice butted against a surface of the one groove in the non-magnetic substrate;

(i) filling openings between the one groove in the non-magnetic substrate and the slice disposed in the one groove with glass;

(j) fusing the glass into the openings;

(k) lapping the glass to form a planar surface to provide a bonded core having a U-shape, wherein the bonded U-shaped core corresponds to a bottom pole of the head;

(l) plating coil turns over the planar surface;

(m) disposing an insulating material provided from a first one of alumina and silicon-dioxide over contact points, front-tip portions and back-closure portions of the bottom pole;

(n) etching insulating material away from contact points, front-tip portions and back-closure portions of the bottom pole;

(o) depositing a gap material on the contact points, front-tip portions and back-closure portions of the bottom pole;

(p) etching the gap material from the back-closure portion of the bottom pole and the contact points; and (q) depositing a top pole over the bottom pole.

19. The method of claim 18 wherein:

the step of cutting at least one slice from a workpiece includes the step of cutting a plurality of slices from the workpiece; and the step of cutting at least one groove in the non-magnetic substrate includes the step of cutting a plurality of grooves in the non-magnetic substrate.

* * * * *